US012334542B2

(12) United States Patent
Canton

(10) Patent No.: US 12,334,542 B2
(45) Date of Patent: *Jun. 17, 2025

(54) SOLID FILM AS BINDER FOR BATTERY ELECTRODES

(71) Applicant: Enevate Corporation, Irvine, CA (US)

(72) Inventor: Giulia Canton, Lake Forest, CA (US)

(73) Assignee: Enevate Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/994,977

(22) Filed: May 31, 2018

(65) Prior Publication Data

US 2019/0181431 A1    Jun. 13, 2019

Related U.S. Application Data

(60) Provisional application No. 62/596,035, filed on Dec. 7, 2017.

(51) Int. Cl.
*H01M 4/1395* (2010.01)
*H01M 4/04* (2006.01)
(Continued)

(52) U.S. Cl.
CPC ....... *H01M 4/1395* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS 3,990,098 A    11/1976    Mastrangelo
5,468,358 A    11/1995    Ohkawa et al.
(Continued)

FOREIGN PATENT DOCUMENTS

CN    1667855    9/2005
CN    102834955    12/2012
(Continued)

OTHER PUBLICATIONS

International Search Report and Written Opinion for International Application No. PCT/US2018/064301, dated Feb. 26, 2019 in 52 pages.
(Continued)

*Primary Examiner* — Zhongqing Wei
(74) *Attorney, Agent, or Firm* — McAndrews, Held & Malloy, Ltd.

(57) ABSTRACT

In various embodiments, a method of forming an electrode includes providing a current collector, providing a substantially solid layer of electrode attachment substance on a side of the current collector, providing electrochemically active material adjacent the substantially solid layer of the electrode attachment substance, and adhering the electrochemically active material to the side of the current collector via the electrode attachment substance. In some examples, the electrochemically active material is provided in powder form. In some examples, the electrochemically active material is provided between the substantially solid layer of electrode attachment substance and the current collector.

30 Claims, 4 Drawing Sheets

(51) Int. Cl.

| | | |
|---|---|---|
| *H01M 4/133* | (2010.01) | |
| *H01M 4/134* | (2010.01) | |
| *H01M 4/1393* | (2010.01) | |
| *H01M 4/62* | (2006.01) | |
| *H01M 4/66* | (2006.01) | |
| *H01M 10/0525* | (2010.01) | |
| *H01M 4/02* | (2006.01) | |

(52) U.S. Cl.
CPC .......... *H01M 4/133* (2013.01); *H01M 4/134* (2013.01); *H01M 4/1393* (2013.01); *H01M 4/621* (2013.01); *H01M 4/661* (2013.01); *H01M 4/667* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 5,624,606 A | 4/1997 | Wilson et al. |
| 5,682,288 A | 10/1997 | Wani |
| 5,981,107 A * | 11/1999 | Hamano ............... H01M 4/04 429/231.95 |
| 6,103,423 A | 8/2000 | Itoh et al. |
| 6,287,728 B1 | 9/2001 | Kajiura et al. |
| 6,300,013 B1 | 10/2001 | Yamada et al. |
| 6,413,672 B1 | 7/2002 | Suzuki et al. |
| 6,432,579 B1 | 8/2002 | Tsuji et al. |
| 6,436,576 B1 | 8/2002 | Hossain |
| 6,489,061 B1 | 12/2002 | Hossain |
| 6,589,696 B2 | 7/2003 | Matsubara et al. |
| 6,770,399 B2 | 8/2004 | Umeno et al. |
| 6,946,223 B2 | 9/2005 | Kusumoto et al. |
| 6,949,314 B1 | 9/2005 | Hossain |
| 7,037,581 B2 | 5/2006 | Aramata et al. |
| 7,202,000 B2 | 4/2007 | Iriyama et al. |
| 7,303,838 B2 | 12/2007 | Morita et al. |
| 7,316,792 B2 | 1/2008 | Kosuzu et al. |
| 7,615,314 B2 | 11/2009 | Kawakami et al. |
| 7,670,970 B2 | 3/2010 | Ko |
| 8,603,683 B2 | 12/2013 | Park et al. |
| 8,709,653 B2 | 4/2014 | Lee et al. |
| 9,178,208 B2 | 11/2015 | Park et al. |
| 9,397,338 B2 | 7/2016 | Park et al. |
| 9,553,303 B2 | 1/2017 | Park et al. |
| 9,583,757 B2 | 2/2017 | Park et al. |
| 9,620,809 B2 | 4/2017 | Turon Teixidor et al. |
| 9,647,259 B2 | 5/2017 | Park et al. |
| 9,806,328 B2 | 10/2017 | Park et al. |
| 9,941,509 B2 | 4/2018 | Park et al. |
| 9,997,765 B2 | 6/2018 | Park |
| 10,103,378 B2 | 10/2018 | Park et al. |
| 10,388,943 B2 | 8/2019 | Bonhomme et al. |
| 10,431,808 B2 | 10/2019 | Park et al. |
| 10,461,366 B1 | 10/2019 | Anderson et al. |
| 10,516,155 B2 | 12/2019 | Park et al. |
| 2004/0137327 A1 | 7/2004 | Gross et al. |
| 2005/0266304 A1 | 12/2005 | Honda et al. |
| 2006/0035149 A1 | 2/2006 | Nanba |
| 2006/0040182 A1 | 2/2006 | Kawakami et al. |
| 2006/0051670 A1 | 3/2006 | Aramata et al. |
| 2006/0051675 A1 | 3/2006 | Musha et al. |
| 2006/0127773 A1 | 6/2006 | Kawakami et al. |
| 2006/0134516 A1 | 6/2006 | Im et al. |
| 2006/0147802 A1 | 7/2006 | Yasuda et al. |
| 2006/0148191 A1 | 7/2006 | Mitchell et al. |
| 2006/0275668 A1 | 12/2006 | Peres et al. |
| 2007/0054190 A1 | 3/2007 | Fukui et al. |
| 2007/0054193 A1 | 3/2007 | Ota |
| 2007/0072084 A1 | 3/2007 | Katsushi et al. |
| 2007/0077490 A1 | 4/2007 | Kim et al. |
| 2007/0154811 A1 | 7/2007 | Oh et al. |
| 2007/0212610 A1 | 9/2007 | Sonobe et al. |
| 2007/0243469 A1 | 10/2007 | Kim et al. |
| 2008/0020282 A1 | 1/2008 | Kim et al. |
| 2008/0145757 A1 | 6/2008 | Mah et al. |
| 2008/0145761 A1 | 6/2008 | Petrat et al. |
| 2008/0160409 A1 | 7/2008 | Ishida et al. |
| 2008/0280207 A1 | 11/2008 | Patoux et al. |
| 2008/0286657 A1 | 11/2008 | Hasegawa et al. |
| 2009/0004566 A1 | 1/2009 | Shirane et al. |
| 2009/0023065 A1 | 1/2009 | Hwang |
| 2009/0029256 A1 | 1/2009 | Mah et al. |
| 2009/0053608 A1 | 2/2009 | Choi et al. |
| 2009/0061319 A1 | 3/2009 | Kim et al. |
| 2009/0087743 A1 | 4/2009 | Kim et al. |
| 2009/0117467 A1 | 5/2009 | Zhamu et al. |
| 2009/0117468 A1 | 5/2009 | Eom |
| 2009/0181304 A1 | 7/2009 | Miyamoto et al. |
| 2009/0202911 A1 | 8/2009 | Fukuoka et al. |
| 2009/0246632 A1 | 10/2009 | Fukui et al. |
| 2009/0269667 A1 | 10/2009 | Antonietti et al. |
| 2009/0280414 A1 | 11/2009 | Koh et al. |
| 2009/0283875 A1 | 11/2009 | Garandet et al. |
| 2009/0325072 A1 | 12/2009 | Maeda et al. |
| 2010/0015530 A1 | 1/2010 | Katayama et al. |
| 2010/0068628 A1 | 3/2010 | Ueda |
| 2010/0078599 A1 | 4/2010 | Kumta et al. |
| 2010/0119955 A1 | 5/2010 | Abe et al. |
| 2010/0143798 A1 | 6/2010 | Zhamu et al. |
| 2010/0216027 A1 * | 8/2010 | Fujii ............... H01G 9/016 429/246 |
| 2010/0233534 A1 | 9/2010 | Iwama et al. |
| 2010/0255376 A1 | 10/2010 | Park et al. |
| 2010/0285352 A1 | 11/2010 | Juzkow et al. |
| 2010/0297497 A1 | 11/2010 | Takahata |
| 2011/0020701 A1 | 1/2011 | Park et al. |
| 2011/0177393 A1 * | 7/2011 | Park ............... B82Y 30/00 429/231.8 |
| 2011/0206974 A1 | 8/2011 | Inoue et al. |
| 2011/0236761 A1 | 9/2011 | Endo et al. |
| 2012/0156562 A1 | 6/2012 | Kobayashi et al. |
| 2013/0202960 A1 | 8/2013 | Kim |
| 2013/0260205 A1 * | 10/2013 | Kwon ............... H01M 4/66 429/127 |
| 2013/0302666 A1 * | 11/2013 | Park ............... H01M 4/606 429/163 |
| 2014/0057170 A1 | 2/2014 | Cha et al. |
| 2014/0170451 A1 | 6/2014 | Iwasaki et al. |
| 2014/0170475 A1 * | 6/2014 | Park ............... H01M 4/0404 429/188 |
| 2014/0170498 A1 | 6/2014 | Park |
| 2014/0295290 A1 | 10/2014 | Park et al. |
| 2015/0010830 A1 | 1/2015 | Park et al. |
| 2015/0137822 A1 | 5/2015 | Joe et al. |
| 2016/0064731 A1 | 3/2016 | Jung et al. |
| 2016/0359164 A1 | 12/2016 | Mui et al. |
| 2017/0040598 A1 | 2/2017 | Wang et al. |
| 2017/0133664 A1 | 5/2017 | Park |
| 2017/0133665 A1 | 5/2017 | Park |
| 2017/0155126 A1 | 6/2017 | Park |
| 2017/0170510 A1 | 6/2017 | Turon Teixidor et al. |
| 2017/0222278 A1 * | 8/2017 | Kwon ............... H01M 10/04 |
| 2017/0279093 A1 | 9/2017 | Park |
| 2018/0062154 A1 | 3/2018 | Park et al. |
| 2018/0198114 A1 | 7/2018 | Bonhomme et al. |
| 2018/0219211 A1 | 8/2018 | Park et al. |
| 2018/0226642 A1 | 8/2018 | Wang et al. |
| 2018/0287129 A1 | 10/2018 | Park |
| 2019/0178944 A1 | 6/2019 | Rango et al. |
| 2019/0181426 A1 | 6/2019 | Park et al. |
| 2019/0181434 A1 | 6/2019 | Lee et al. |
| 2019/0181440 A1 | 6/2019 | Park et al. |
| 2019/0181441 A1 | 6/2019 | Ji et al. |
| 2019/0181491 A1 | 6/2019 | Park et al. |
| 2019/0181492 A1 | 6/2019 | Liu et al. |
| 2019/0181500 A1 | 6/2019 | Ji et al. |
| 2019/0181501 A1 | 6/2019 | Ji et al. |
| 2019/0181502 A1 | 6/2019 | Ji et al. |
| 2019/0190069 A1 | 6/2019 | Ji et al. |
| 2019/0190070 A1 | 6/2019 | Ji et al. |
| 2019/0355966 A1 | 11/2019 | Kamath et al. |
| 2019/0372088 A1 | 12/2019 | Bonhomme et al. |

(56) References Cited

U.S. PATENT DOCUMENTS

FOREIGN PATENT DOCUMENTS

| EP | 0 949 702 | 10/1999 |
|---|---|---|
| EP | 1 054 462 | 11/2000 |
| EP | 1 722 429 | 11/2006 |
| EP | 2 113 955 | 11/2009 |
| EP | 2 400 583 | 12/2011 |
| EP | 3 382 776 | 10/2018 |
| GB | 2 483 372 | 3/2012 |
| JP | 2000-106218 | 4/2000 |
| JP | 2000-133274 | 5/2000 |
| JP | 2000-173667 | 6/2000 |
| JP | 2000-272911 | 10/2000 |
| JP | 2001-006682 | 1/2001 |
| JP | 2002-151157 | 5/2002 |
| JP | 2002-246013 | 8/2002 |
| JP | 2002-367601 | 12/2002 |
| JP | 2003-165715 | 6/2003 |
| JP | 2004-006285 | 1/2004 |
| JP | 2004-095198 | 3/2004 |
| JP | 2004-103405 | 4/2004 |
| JP | 2004-327319 | 11/2004 |
| JP | 2005-158721 | 6/2005 |
| JP | 2007-073334 | 3/2007 |
| JP | 2007-123141 | 5/2007 |
| JP | 2007-165061 | 6/2007 |
| JP | 2007-531245 | 11/2007 |
| JP | 2008-153006 | 7/2008 |
| JP | 2009-026760 | 2/2009 |
| JP | 2009-037842 | 2/2009 |
| JP | 2009-176540 | 8/2009 |
| JP | 2010-146901 | 7/2010 |
| JP | 2012-014866 | 1/2012 |
| JP | 2012-028322 | 2/2012 |
| JP | 2012-527085 | 11/2012 |
| JP | 2012-252962 | 12/2012 |
| JP | 2013-045759 | 3/2013 |
| JP | 2017107851 | 6/2017 |
| KR | 2001-0081928 | 8/2001 |
| KR | 2009-0011888 | 2/2009 |
| KR | 2009-0109225 | 10/2009 |
| WO | WO 98/028804 | 7/1998 |
| WO | WO 2010/092977 | 8/2010 |
| WO | WO 2011/088472 | 7/2011 |
| WO | WO 2012/050407 | 4/2012 |
| WO | 2014163986 | 10/2014 |
| WO | WO 2019/113340 | 6/2019 |
| WO | WO 2019/113346 | 6/2019 |
| WO | WO 2019/113349 | 6/2019 |

OTHER PUBLICATIONS

Gao et al., "Engineered Si Sandwich Electrode: Si Nanoparticles/ Graphite Sheet Hybrid on Ni Foam for Next-Generation High-Performance Lithium-Ion Batteries", ACS Applied Materials & Interfaces, 2015, vol. 7, No. 3, pp. 1693-1698.

Kamali et al., "Review on Carbon and Silicon Based Materials as Anode Materials for Lithium Ion Batteries", Journal of New Materials for Electrochemical Systems, 2010, vol. 13, pp. 147-160.
Choi et al., "Enhanced Electrochemical Properties of a Si-based Anode Using an Electrochemically Active Polyamide Imide Binder", Journal of Power Sources, 2008, vol. 177, pp. 590-594.
Cui et al., "Inorganic Glue Enabling High Performance of Silicon Particles as Lithium Ion Battery Anode", Journal of the Electrochemical Society, 2011, vol. 158, No. 5, A592-A596.
Datta, et al., "Silicon, Graphite and Resin Based Hard Carbon Nanocomposite Anodes for Lithium Ion Batteries", Journal of Power Sources, Feb. 10, 2007, vol. 165, No. 1, pp. 368-378.
Du et al., "Electrochemistry of $Cu_xSi_{1-x}$ Alloys in Li Cells", Journal of the Electrochemical Society, 2016, vol. 163, No. 7, pp. A1275-A1279.
International Search Report and Written Opinion for International Application No. PCT/US2014/019669, dated Aug. 28, 2014 in 13 pages.
International Preliminary Report on Patentability and Written Opinion for International Application No. PCT/US2014/019669, dated Sep. 24, 2015 in 10 pages.
Ji et al., "Electrospun Carbon Nanofibers Containing Silicon Particles as an Energy-Storage Medium", Carbon, Nov. 2009, vol. 47, No. 14, pp. 3219-3226.
Lee et al., "Graphene-Silicon Composite for Li-Ion Battery Anodes", http://apps.aiche.org/proceedings/Abstracts.aspx?PaperiD=162914, dated Sep. 11, 2009 [Retrieved Jun. 23, 2011].
Lee et al., "Silicon Nanoparticles-Graphene Paper Composites for Li ion Battery Anodes", Chemical Communications, 2010, vol. 46, No. 12, pp. 2025-2027.
Li et al., "Copper Deposition and Thermal Stability Issues in Copper-Based Metallization for ULSI Technology", Materials Science Reports, vol. 9, No. 1, 1992, pp. 1-51.
Ludwig et al., "Solvent-Free Manufacturing of Electrodes for Lithium-ion Batteries", Scientific Reports, Mar. 17, 2016, 6:23150, pp. 1-10.
Ma et al., "Si-Based Anode Materials for Li-Ion Batteries: A Mini Review", Nano-Micro Letters, 2014, vol. 6, No. 4, pp. 347-358.
Mazouzi et al., "Very High Surface Capacity Observed Using Si Negative Electrodes Embedded in Copper Foam as 3D Current Collectors", Advanced Energy Materials, 2014, vol. 4, 1301718, pp. 1-13.
Sufryd et al., "Experimental investigation of the Cu-Si phase diagram at x(Cu)>0.72", Intermetallics, 2011, vol. 19, pp. 1479-1488.
Wolf, H. et al., "Carbon-Fiber-Silicon Nanocomposites for Lithium-Ion Battery Anodes by Microwave Plasma Chemical Vapor Deposition", Journal of Power Sources, May 1, 2009, vol. 190, No. 1, pp. 157-161.
International Searching Authority, "Intenational Search Report and Written Opinion", issued in connection with Application No. PCT/US2018/064301, Feb. 26, 2019, 13 pages.
Written Opinion for International Application No. PCT/US2018/064301, dated Dec. 3, 2019 in 5 pages.

* cited by examiner

SOLID FILM AS BINDER FOR BATTERY ELECTRODES

CROSS-REFERENCE TO RELATED APPLICATIONS

This application claims the benefit of U.S. Provisional Application No. 62/596,035, filed Dec. 7, 2017. The entirety of the above referenced application is hereby incorporated by reference.

BACKGROUND

Field

The present disclosure relates to electrochemical cells and electrodes used in electrochemical cells. In particular, the present disclosure relates to electrodes and electrochemical cells for use in batteries, including methods of forming electrodes and electrochemical cells.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electro-chemically active material layers on electrically conductive metals (e.g., aluminum and copper). For example, electrochemically active material can be deposited onto a current collector along with an inactive binder material. Electrodes can be rolled or cut into pieces which are then layered into stacks. The stacks are of alternating electro-chemically active materials with the separator between them.

SUMMARY

Example methods of forming electrodes are provided. The method can include providing a current collector, providing a substantially solid layer of electrode attachment substance on a side of the current collector, and providing electrochemically active material adjacent the substantially solid layer of the electrode attachment substance. The electrochemically active material can be provided in powder form. The method can also include adhering the electrochemically active material to the side of the current collector via the electrode attachment substance.

In various methods, providing the electrochemically active material adjacent the layer of electrode attachment substance can comprise sandwiching the layer of electrode attachment substance between the electrochemically active material and the current collector. Some such methods can further comprise providing a second layer of electrode attachment substance adjacent the electrochemically active material such that the electrochemically active material is sandwiched between the two layers of electrode attachment substance. In some methods, providing the electrochemically active material adjacent the layer of electrode attachment substance can comprise sandwiching the electrochemically active material between the layer of electrode attachment substance and the current collector.

In some methods, the layer of electrode attachment substance can comprise a thermoplastic film. The layer of electrode attachment substance can be insoluble in solvent at a temperature below about 200° C. The layer of electrode attachment substance can comprise a polyphenylene sulfide film, a polyether ether ketone film, a polyether sulfone film, a polysulfone film, or a polyethylene terephthalate film. The electrochemically active material can comprise a silicon carbon composite material. In some examples, the electrochemically active material can include at least about 50% to about 100% by weight of silicon. For instance, the electrochemically active material can include the silicon at about 60% to about 100% by weight, at about 70% to about 100% by weight, or at about 80% to about 100% by weight.

In some methods, adhering can comprise applying pressure to the electrode attachment substance and/or the electrochemically active material to adhere the electrochemically active material to the current collector. In some methods, adhering can comprise applying heat to the electrode attachment substance and/or the electrochemically active material to adhere the electrochemically active material to the current collector. In some methods, adhering can include an extrusion process. The current collector can be provided in roll form. The layer of electrode attachment substance can be provided in roll form. The method can comprise a roll to roll process.

Various methods can further include providing a second layer of electrode attachment substance on second side of the current collector, providing a second electrochemically active material adjacent the second layer of electrode attachment substance, and adhering the second electrochemically active material to the second side of the current collector via the second layer of electrode attachment substance. In some methods, providing the second electrochemically active material adjacent the second layer of electrode attachment substance can comprise sandwiching the second layer of electrode attachment substance between the second electrochemically active material and the current collector. The methods can further include providing a third layer of electrode attachment substance adjacent the second electrochemically active material such that the second electrochemically active material is sandwiched between the two layers of electrode attachment substance. In some methods, providing the second electrochemically active material adjacent the second layer of electrode attachment substance can comprise sandwiching the second electrochemically active material between the second layer of electrode attachment substance and the current collector.

In some methods, the second layer of electrode attachment substance can be provided in a substantially solid state. The second layer of electrode attachment substance can comprise a thermoplastic film. The second layer of electrode attachment substance can be insoluble in solvent at a temperature below about 200° C. The second layer of electrode attachment substance can comprise a polyphenylene sulfide film, a polyether ether ketone film, a polyether sulfone film, a polysulfone film, or a polyethylene terephthalate film.

In some instances, the second layer of electrode attachment substance can comprise a different material than the substantially solid layer of electrode attachment substance. The second electrochemically active material can be provided in powder form. The second electrochemically active material can comprise a silicon carbon composite material. In some examples, the second electrochemically active material can include at least about 50% to about 100% by weight of silicon. For instance, the second electrochemically active material can include the silicon at about 60% to about 100% by weight, at about 70% to about 100% by weight, or at about 80% to about 100% by weight.

In some methods, adhering the electrochemically active material and adhering the second electrochemically active material can occur simultaneously. The electrode can be a negative electrode.

Additional example methods of forming electrodes are provided. The method can include providing a current collector, providing a layer comprising electrochemically active material on a side of the current collector, and providing a substantially solid layer of electrode attachment substance adjacent the layer comprising electrochemically active material such that the electrochemically active material is between the substantially solid layer of electrode attachment substance and the current collector. The method can also include adhering the electrochemically active material to the side of the current collector via the electrode attachment substance.

Various methods can further comprise providing a second substantially solid layer of electrode attachment substance between the layer comprising electrochemically active material and the current collector such that the electrochemically active material is sandwiched between both of the provided layers of electrode attachment substance. The electrochemically active material can be provided in powder form. The electrochemically active material can be provided as a film. The film can comprise a silicon carbon composite film. In some examples, the electrochemically active material can comprise at least about 50% to about 100% by weight of silicon. For instance, the electrochemically active material can include the silicon at about 60% to about 100% by weight, at about 70% to about 100% by weight, or at about 80% to about 100% by weight.

In some methods, the layer of electrode attachment substance can comprise a thermoplastic film. The layer of electrode attachment substance can be insoluble in solvent at a temperature below about 200° C. The layer of electrode attachment substance can comprise a polyphenylene sulfide film, a polyether ether ketone film, a polyether sulfone film, a polysulfone film, or a polyethylene terephthalate In some methods, adhering can comprise applying pressure to the electrode attachment substance and/or the electrochemically active material to adhere the electrochemically active material to the current collector. In some methods, adhering can comprise applying heat to the electrode attachment substance and/or the electrochemically active material to adhere the electrochemically active material to the current collector. In some methods, adhering can include an extrusion process. The current collector can be provided in roll form. The layer of electrode attachment substance can be provided in roll form. The layer of electrochemically active material can be provided in roll form. The method can comprise a roll to roll process.

Various methods can further include providing a layer comprising a second electrochemically active material on a second side of the current collector, providing a substantially solid layer of a second electrode attachment substance adjacent the layer comprising the second electrochemically active material such that the second electrochemically active material is between the second electrode attachment substance and the current collector, and adhering the second electrochemically active material to the second side of the current collector via the second electrode attachment substance. The methods can further include providing a substantially solid layer of a third electrode attachment substance between the layer comprising the second electrochemically active material and the current collector such that the second electrochemically active material is sandwiched between the second and third electrode attachment substance.

In some methods, the second electrochemically active material can be provided in powder form. The second electrochemically active material can be provided as a film. In some instances, the second electrochemically active material can comprise a silicon carbon composite film. In some examples, the second electrochemically active material can include at least about 50% to about 100% by weight of silicon. For instance, the second electrochemically active material can include the silicon at about 60% to about 100% by weight, at about 70% to about 100% by weight, or at about 80% to about 100% by weight.

In some methods, the second electrode attachment substance can comprise a thermoplastic film. The second electrode attachment substance can comprise a different material than the electrode attachment substance.

In some methods, adhering the electrochemically active material and adhering the second electrochemically active material can occur simultaneously. The electrode can be a negative electrode.

DETAILED DESCRIPTION

Commercial lithium-ion battery electrodes are commonly fabricated by casting a slurry onto a metallic current collector. The slurry typically includes active material, conductive additive (e.g., carbon), and binder in a solvent (e.g., N-Methyl-2-pyrrolidone (NMP)). In general, the slurry after being uniformly mixed is cast onto the current collector and the solvent is dried off. The drying process time can be consuming and costly, with the added cost of the sacrificial solvent which in most cases can come with risks of pollution and/or safety hazards. In addition, the use of a cast slurry as electrode material can limit the number of binders that can be used to fabricate such electrode. For example, generally, the binder must be chemically inert to the electrolyte within the battery, but at the same time, it needs to be fairly easily dissolvable in the solvent used for the slurry mix.

Certain implementations described herein utilize one or more substantially solid layers of electrode attachment substance to adhere the electrochemically active material to the current collector. For example, a single solid film or multiple solid films (e.g., one or more thermoplastic films) can be used as the binder/adhesive of the electrode active material by binding together active material powders or other active material (e.g., an active material film) to the current collector. In various instances, using a solid film as adhesive/binder material for active material can allow fabrication of battery electrodes in a roll to roll process. In some embodiments, using a solid film as adhesive/binder material can also allow for fabrication without any solvent for slurry mixes and/or without coating of slurry mixes. By adhering active material to a current collector without the use of a slurry mix, there is no need to dissolve the binder materials in a solvent in order to make the slurry mix. Some such embodiments can be solvent free, e.g., solvent free roll to roll fabrication of battery electrodes, which can reduce production time and lower production cost (e.g., due to no solvent for slurry mixes, no coating of slurry mixes, and/or no drying of slurry mixes). Some such processes can be based on pressure and/or temperature to allow adhesion/binding.

Figures 1A, 1B, 1C, 1D:
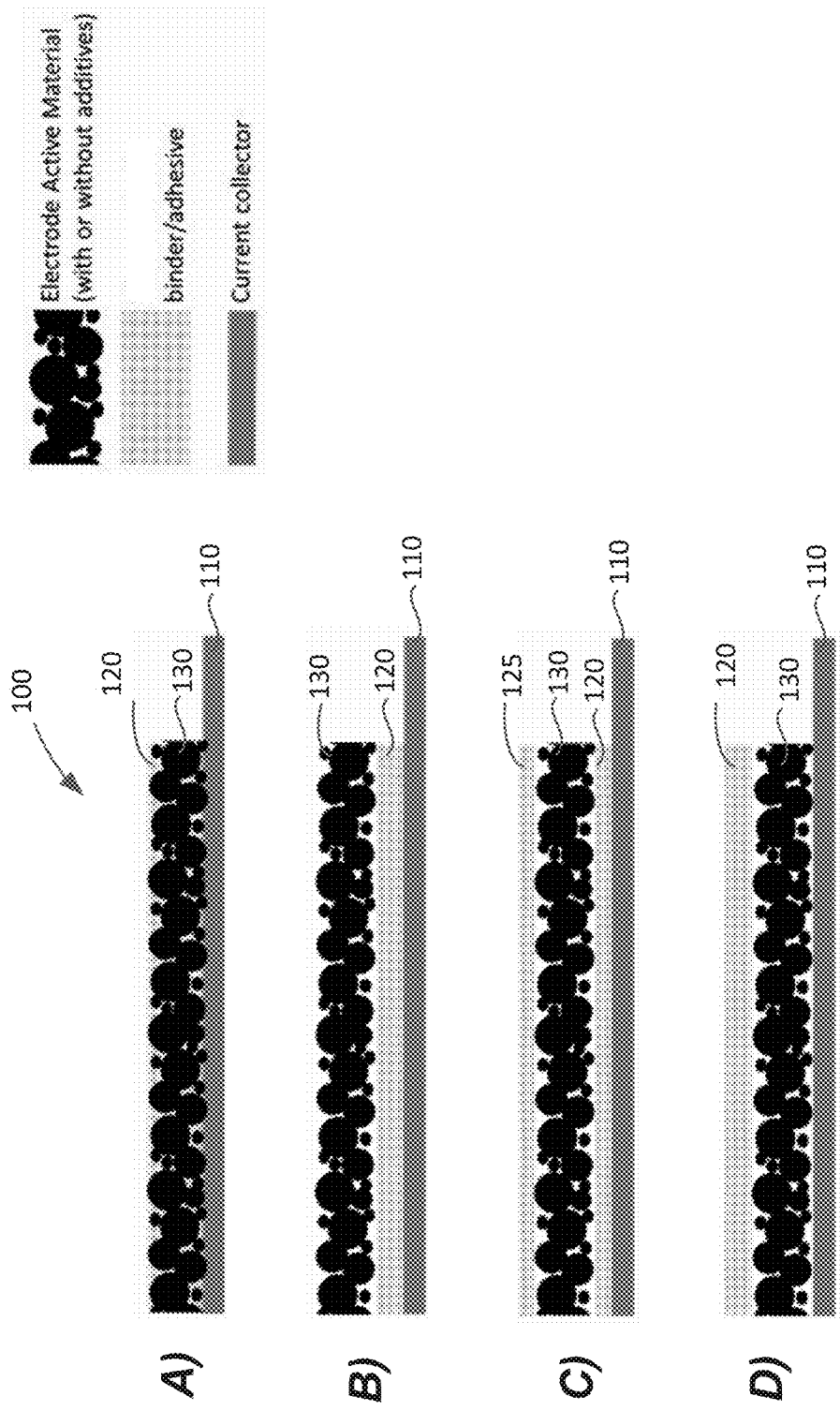
FIG. 1A schematically illustrates an example electrode in accordance with certain embodiments described herein.
FIGS. 1B, 1C, and 1D schematically illustrate examples of various configurations to prepare layers of current collector, electrode attachment substance, and electrode active material to form an electrode.

FIG. 1A schematically illustrates an example electrode in accordance with certain embodiments described herein. The electrode 100 can be used as a negative electrode (e.g., an anode), a positive electrode (e.g., a cathode), or both. Various embodiments of the electrode 100 can be used in an electrochemical cell. The electrode 100 can be used in either secondary batteries (e.g., rechargeable) or primary batteries (e.g., non-rechargeable). The electrochemical cell can include a lithium ion battery.

With continued reference to FIG. 1A, the example electrode 100 can include a current collector 110, a substantially solid layer of electrode attachment substance 120, and a layer comprising electrochemically active material 130. The current collector 110 can include any current collector material known in the art or yet to be developed. For example, the current collector 110 can include a metal. Example metals include, but are not limited to, copper, nickel, iron, titanium, molybdenum, stainless steel, chromium, aluminum, or a combination thereof. In some instances, copper and/or nickel can be used for an anode, and aluminum can be used for a cathode. In some embodiments, the current collector 110 can include non-metallic materials. An example non-metallic conductive material includes carbon.

The electrode attachment substance 120 (e.g., adhesive) can be used to couple or adhere the electrochemically active material 130 to the current collector 110 (e.g., to prevent delamination between them). In various embodiments, the attachment substance 120 is in a substantially solid state. For example, the attachment substance 120 can be a thermoplastic film/foil. Since certain embodiments do not coat a slurry mix on a current collector, the attachment substance 120 is not limited to binders which are soluble in solvents. For example, the attachment substance 120 can include a polyphenylene sulfide (PPS) film, which typically is insoluble in solvent at a temperature below about 200° C./392° F. Some other examples of attachment substance 120 can include films/foils of polyether ether ketone (PEEK), polyether sulfone (PES), polysulfone (PSU), or polyethylene terephthalate (PET).

With continued reference to FIG. 1A, the layer comprising electrochemically active material 130 can include any electrochemically active material in any form (e.g., powder or film form). In some examples, the electrochemically active material can include silicon, germanium, tin, oxide, carbon, graphite, or a combination thereof. Various embodiments can include a silicon-carbon (or carbon-silicon) composite material. U.S. patent application Ser. No. 13/008,800, filed Jan. 18, 2011, and published on Jul. 21, 2011 as U.S. Patent Application Publication No. 2011/0177393, entitled "Composite Materials for Electrochemical Storage;" U.S. patent application Ser. No. 13/601,976, filed Aug. 31, 2012, and published on Jun. 19, 2014 as U.S. Patent Application Publication No. 2014/0170498, entitled "Silicon Particles for Battery Electrodes;" and U.S. patent application Ser. No. 13/799,405, filed Mar. 13, 2013, and published on Jun. 19, 2014 as U.S. Patent Application Publication No. 2014/0166939, entitled "Silicon Particles for Battery Electrodes," each of which is incorporated by reference herein, describe certain embodiments of carbon-silicon composite materials using carbonized polymer and silicon material. In various embodiments, the layer of electrochemically active material 130 can include a film, e.g., a silicon-carbon composite film.

The layer of electrochemically active material 130 can include electrode active material with or without additives. For example, the layer of electrochemically active material 130 can include from greater than 0% to about 100% by weight of electrochemically active material. For example, the amount of electrochemically active material by weight of the layer of electrochemically active material 130 can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, about 100%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 100% by weight, from about 30% to about 85% by weight, from about 30% to about 90% by weight, from about 30% to about 95% by weight, from about 30% to about 100% by weight, from about 50% to about 85% by weight, from about 50% to about 90% by weight, from about 50% to about 95% by weight, from about 50% to about 100% by weight, from about 60% to about 85% by weight, from about 60% to about 90% by weight, from about 60% to about 95% by weight, from about 60% to about 100% by weight, from about 70% to about 85% by weight, from about 70% to about 90% by weight, from about 70% to about 95% by weight, from about 70% to about 100% by weight, from about 80% to about 90% by weight, from about 80% to about 95% by weight, from about 80% to about 100% by weight, etc.).

As an example, the layer of electrochemically active material 130 can include at least about 50% to about 100% by weight of silicon, at least about 60% to about 100% by weight of silicon, at least about 70% to about 100% by weight of silicon, at least about 80% to about 100% by weight of silicon. In some examples, the layer of electrochemically active material 130 can include 100% silicon.

FIGS. 1B, 1C, and 1D schematically illustrate various example configurations to prepare the layers of current collector 110, electrode attachment substance 120 (e.g., binder/adhesive), and electrode active material 130 to form an electrode. In FIG. 1B, a substantially solid layer of electrode attachment substance 120 is sandwiched between a layer of electrochemically active material 130 and the current collector 110. In FIG. 1C, the layer of electrochemically active material 130 is sandwiched between two layers electrode attachment substance 120, 125. In FIG. 1D, the layer of electrochemically active material 130 is sandwiched between the layer of electrode attachment substance 120 and the current collector 110. In some instances, the layers in FIGS. 1B, 1C, and 1D can be extruded, heat laminated, roll pressed, flat pressed, etc. to form the example electrode illustrated in FIG. 1A. The attachment substance 120 can bind to the active material 130 and current collector 110.

Figure 2:
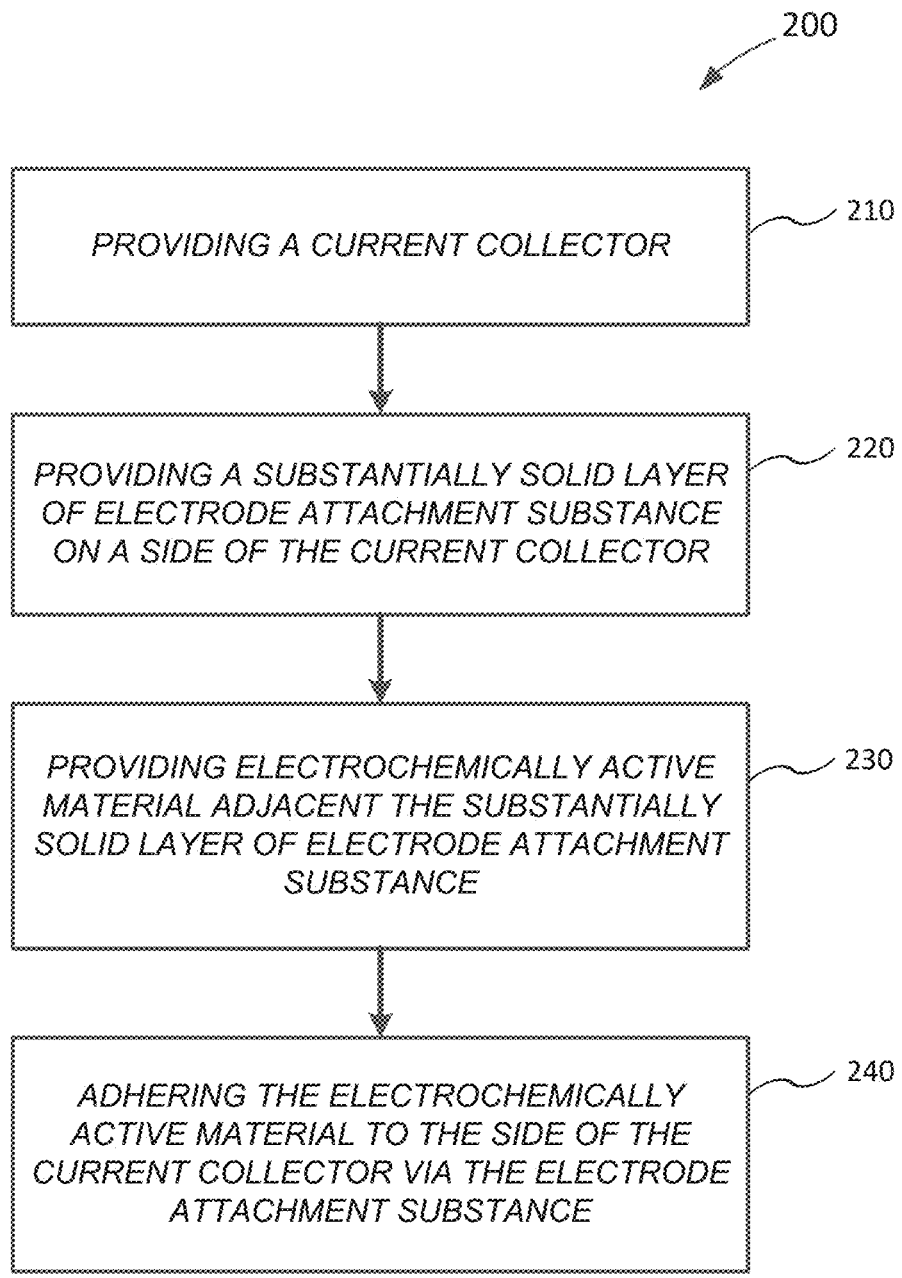
FIG. 2 shows an example method of forming an electrode in accordance with certain embodiments described herein.

FIG. 2 illustrates an example method of forming an electrode (e.g., the electrode 100 schematically illustrated in FIG. 1A). The method 200 of forming can include providing a current collector, as shown in block 210, and providing a substantially solid layer of electrode attachment substance on a side of the current collector, as shown in block 220. The method 200 can also include providing electrochemically active material adjacent the substantially solid layer of electrode attachment substance, as shown in block 230. Further, the method 200 can include adhering the electrochemically active material to the side of the current collector via the electrode attachment substance, as shown in block 240.

With reference to block 210, the current collector (e.g., current collector 110 in FIGS. 1A-1D) can be provided as a sheet (e.g., foil, film, etc.). In some instances, the current collector can be provided in roll form. With reference to block 220, the substantially solid layer of electrode attachment substance (e.g., attachment substance 120 in FIGS. 1A-1D) can be provided in roll form as well to allow a roll to roll process. With reference to block 230, the electrochemically active material can be provided in powder (e.g., particles, fibers, etc.) or film (e.g., sheet, foil, etc.) form.

When provided in powder form, the electrochemically active material can be dispersed on the solid layer of electrode attachment substance (e.g., as in FIGS. 1B and 1C) or on the current collector (e.g., as in FIG. 1D). When provided in film form, the active materials can be pre-processed and available in sheets or in roll form (e.g., allowing for roll to roll processing). The film can be placed on the solid layer of electrode attachment substance (e.g., as in FIGS. 1B and 1C) or on the current collector (e.g., as in FIG. 1D).

As shown in FIG. 1B, the electrochemically active material 130 can be provided adjacent the layer of electrode attachment substance 120 such that the layer of electrode attachment substance 130 is between the electrochemically active material 130 and the current collector 110 (e.g., the layer of electrode attachment substance 120 sandwiched between the layer of electrochemically active material 130 and the current collector). In some instances, as shown in FIG. 1C, a second layer of electrode attachment substance 125 can be provided adjacent the electrochemically active material 130 such that the electrochemically active material 130 can be sandwiched between the two layers of electrode attachment substance 120, 125. In some embodiments, as shown in FIG. 1D, the electrochemically active material 130 can be provided adjacent the layer of electrode attachment substance 120 such that the electrochemically active material 130 can be sandwiched between the layer of electrode attachment substance 120 and the current collector 110.

With reference to block 240, the electrochemically active material can be adhered to the side of the current collector via the electrode attachment substance (e.g., to form FIG. 1A). In some embodiments, the layers can undergo an extrusion process to adhere the layers together. In some instances, the layers can be adhered mechanically by applying pressure and/or adhered thermally by applying heat to one or more of the layers. For example, a pressure from about 10 MPa to about 45 MPa (e.g., any pressure within this range such as about 10 MPa, about 15 MPa, about 20 MPa, about 25 MPa, about 30 MPa, etc.), or any range within this range (e.g., any range formed by the example values such as about 10 MPa to about 40 MPa, about 10 MPa to about 35 MPa, about 15 MPa to about 45 MPa, about 15 MPa to about 40 MPa, about 20 MPa to about 45 MPa, about 20 MPa to about 40 MPa, about 20 MPa to about 35 MPa, about 25 MPa to about 35 MPa, etc.) can be applied. As another example, a temperature from about 150° C. to about 350° C. (e.g., any temperature within this range such as about 150° C., about 175° C., about 200° C., about 225° C., about 250° C., about 275° C., about 300° C., about 325° C., about 350° C., etc.) or any range within this range (e.g., any range formed by the example values such as about 150° C. to about 325° C., about 150° C. to about 300° C., about 200° C. to about 350° C., about 200° C. to about 325° C., about 200° C. to about 300° C., etc.) can be applied. As another example, the layers can be adhered with a two-step process, such as applying a first lower temperature (e.g., from about 150° C. to about 250° C., from about 160° C. to about 250° C., from about 170° C. to about 250° C., from about 180° C. to about 230° C., from about 180° C. to about 240° C., from about 180° C. to about 250° C., etc.) followed by a higher temperature (e.g., from about 260° C. to about 300° C., from about 260° C. to about 310° C., from about 260° C. to about 325° C., from about 260° C. to about 350° C., etc.). In some instances, the attachment substance 120 can be adhered to the current collector 110 at a lower temperature, and the electrochemically active material 130 can be adhered to the current collector 110 at a higher temperature. Other examples are possible.

Although FIGS. 1A-1D illustrate active material on one side of the current collector, electrochemically active material can also be placed on the other side of the current collector, e.g., using one or more similar processes. For example, a layer of electrode attachment substance can be provided on the other side of the current collector, and electrochemically active material can be provided adjacent that layer of electrode attachment substance. The electrochemically active material can be adhered to that side of the current collector via the layer of electrode attachment substance. In some instances, the layer of electrode attachment substance can be sandwiched between the electrochemically active material and the current collector. In some instances, the electrochemically active material can be sandwiched between two layers of electrode attachment substance. In some instances, the electrochemically active material can be sandwiched between the layer of electrode attachment substance and the current collector.

The electrode attachment substance can be the same as or different from the electrode attachment substance on the other side of the current collector. The electrode attachment substance can include any of the attachment substances described herein. For example, the electrode attachment substance can be provided in a substantially solid state. The attachment substance can be a thermoplastic film. In some instances, the attachment substance can be polyphenylene sulfide or any other polymer that is insoluble in a solvent e.g., at a temperature below about 200° C. Some other examples of attachment substance 120 can include films/foils of polyether ether ketone (PEEK), polyether sulfone (PES), polysulfone (PSL), or polyethylene terephthalate (PET).

The electrochemically active material can be the same as or different from the electrochemically active material on the other side of the current collector. The electrochemically active material can include any of the electrochemically active material described herein. For example, the electrochemically active material can be in powder or film form. The active material can include a silicon carbon composite material. In some examples, the active material can include at least about 50% to about 100% by weight of silicon, at least about 60% to about 100% by weight of silicon, at least about 70% to about 100% by weight of silicon, at least about 80% to about 100% by weight of silicon, or 100% by weight of silicon.

The electrochemically active material can be adhered to the current collector as described herein (e.g., by applying pressure and/or heat). In some instances, adhering the electrochemically active material on both sides of the current collector can occur simultaneously. In some instances, the electrochemically active material can be adhered sequentially on one side of the current collector and then on the other side of the current collector.

Figure 3:
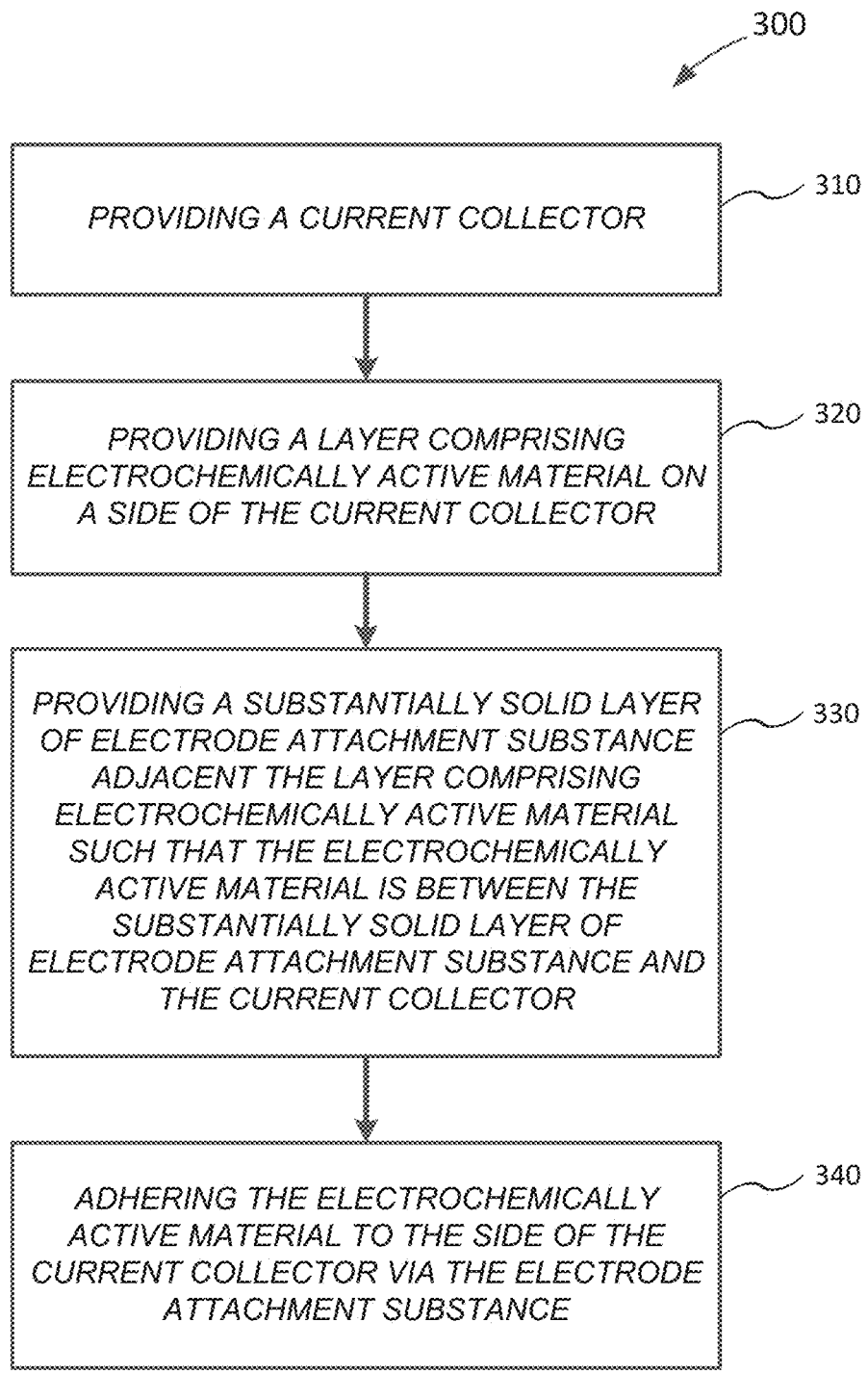
FIG. 3 shows another example method of forming an electrode in accordance with certain embodiments described herein.

FIG. 3 illustrates another example method of forming an electrode (e.g., the electrode 100 schematically illustrated in FIG. 1A). The method 300 of forming can include providing a current collector, as shown in block 310, and providing a layer comprising electrochemically active material on a side of the current collector, as shown in block 320. The method 300 can also include providing a substantially solid layer of electrode attachment substance adjacent the layer comprising electrochemically active material such that the electrochemically active material is between the substantially solid layer of electrode attachment substance and the current collector, as shown in block 330. Further, the method 300 can include adhering the electrochemically active material to the side of the current collector via the electrode attachment substance, as shown in block 340.

With reference to block 310, in some instances, the current collector (e.g., current collector 110 in FIGS. 1C and 1D) can be provided as a sheet (e.g., foil, film, etc.). In some instances, the current collector can be provided in roll form. With reference to block 320, the electrochemically active material can be provided in powder or film form. When provided in film form, the active material can also be available in sheets or in roll form (e.g., allowing for roll to roll processing). As in FIGS. 1C and 1D, in some embodiments, when provided in powder or film form, the electrochemically active material 130 can be placed directly or indirectly on the current collector 110. With reference to block 330, the substantially solid layer of electrode attachment substance (e.g., attachment substance 120 in FIGS. 1C and 1D) can also be provided in roll form to allow a roll to roll process. As in FIG. 1D, the layer of electrode attachment substance 120 can be provided on the electrochemically active material 130. As in FIG. 1C, the electrochemically active material 130 can be sandwiched between two layers of electrode attachment substance 120, 125.

With reference to block 340, the electrochemically active material can be adhered to the side of the current collector via the electrode attachment substance (e.g., to form FIG. 1A). Similar to method 200 in FIG. 2, the layers can undergo an extrusion process in some embodiments to adhere the layers together, the layers can be adhered by applying pressure and/or heat to one or more of the layers, and electrochemically active material can be placed on both sides of the current collector (e.g., using one or more similar processes as described herein). For example, a layer comprising electrochemically active material can be provided on the other side of the current collector, and a layer of electrode attachment substance can be provided adjacent that layer comprising electrochemically active material. The electrochemically active material can be adhered to that side of the current collector via the layer of electrode attachment substance. In some instances, the layer of electrode attachment substance can be placed between the electrochemically active material and the current collector. In some instances, the electrochemically active material can be placed (e.g., sandwiched in some instances) between the electrode attachment substance and the current collector. In some instances, the electrochemically active material can be sandwiched between two layers of electrode attachment substance.

The electrode attachment substance can be the same as or different from the electrode attachment substance on the other side of the current collector. The electrode attachment substance can include any of the attachment substances described herein. For example, the electrode attachment substance can be provided in a substantially solid state. The attachment substance can be a thermoplastic film. In some instances, the attachment substance can be polyphenylene sulfide or any other polymer that is insoluble in a solvent e.g., at a temperature below about 200° C. Some other examples of attachment substance 120 can include films/foils of polyether ether ketone (PEEK), polyether sultone (PES), polysulfone (PSU), or polyethylene terephthalate (PET).

The electrochemically active material can be the same as or different from the electrochemically active material on the other side of the current collector. The electrochemically active material can include any of the electrochemically active material described herein. For example, the electrochemically active material can be in powder or film form. The active material can include a silicon carbon composite material. In some examples, the active material can include at least about 50% to about 100% by weight of silicon, at least about 60% to about 100% by weight of silicon, at least about 70% to about 100% by weight of silicon, at least about 80% to about 100% by weight of silicon, or 100% by weight of silicon.

The electrochemically active material can be adhered to the current collector as described herein (e.g., by applying pressure and/or heat). In some instances, adhering the electrochemically active material on both sides of the current collector can occur simultaneously. In some instances, the electrochemically active material can be adhered sequentially on one side of the current collector and then on the other side of the current collector.

In various embodiments, after the electrode is formed, the electrode can be punched and processed. In certain embodiments, an electrode can be attached to a separator using an attachment substance similar to the electrode attachment substance described herein. For example, a separator and an electrode can be provided. A substantially solid layer of attachment substance can also be provided on the separator and/or the electrode. The separator and electrode can be adhered together via the attachment substance (e.g., by applying pressure and/or heat).

EXAMPLES

The following examples are provided to demonstrate the benefits of some embodiments of electrodes, electrochemical cells, and methods of forming the same. These examples are discussed for illustrative purposes and should not be construed to limit the scope of the disclosed embodiments.

Figure 4:
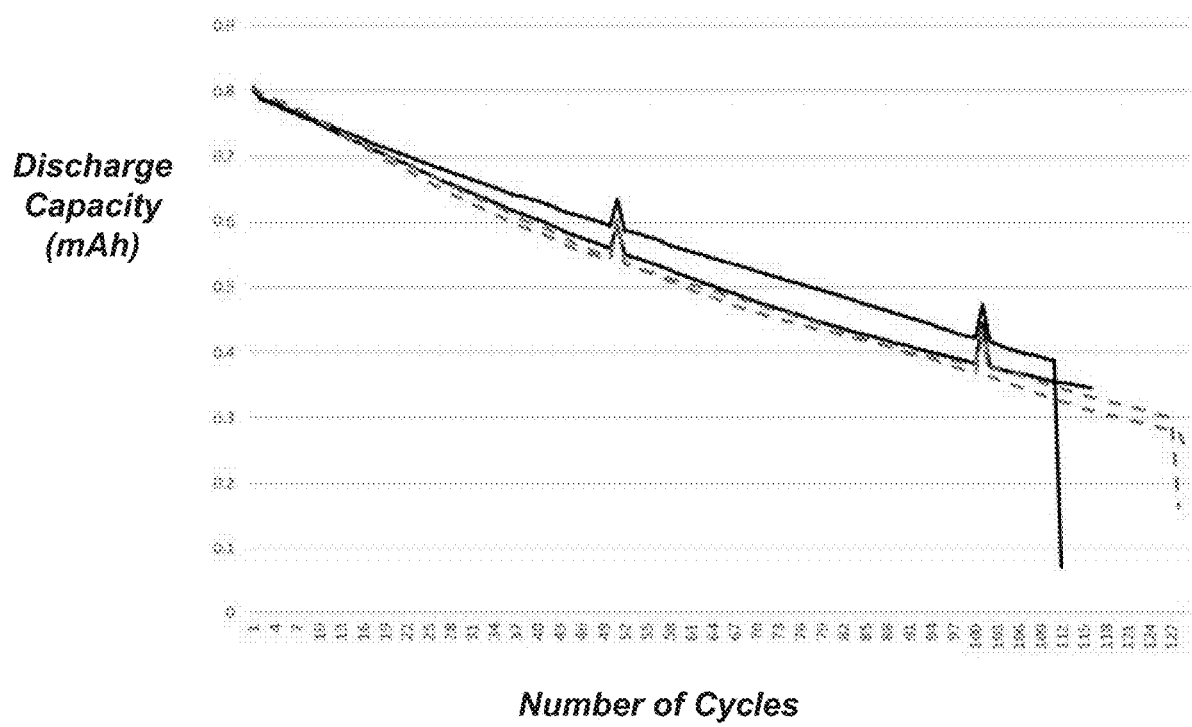
FIG. 4 is a plot of the discharge capacity versus the number of cycles for electrodes made using a binder in N-Methyl-2-pyrrolidone (NMP) solution compared to example electrodes made in accordance with certain embodiments described herein.

Sample electrodes (e.g., anodes) were made in accordance with certain embodiments described herein. For example, two samples of silicon dominant electrochemically active material (i.e., carbon-silicon composite films made using pyrolyzed polymer and silicon material) were attached to copper foil using thermoplastic film (Torelina® 4 μm Polyphenylene sulfide (PPS) film) with a solvent free, high temperature and pressure method. The samples were pressed at about 28 MPa (e.g., about 4000 psi). The PPS film was adhered to the copper foil at about 220° C., and the silicon dominant electrochemically active material was adhered thereon at about 300° C. Electrodes were also made using binder in N-Methyl-2-pyrrolidone (NMP) solution. For example, two samples of the same silicon dominant electrochemically active material were attached to copper foil by coating it in a slurry of binder in NMP solution. FIG. 4 is a plot of the discharge capacity versus the number of cycles for the electrodes. The performance of the electrodes made using thermoplastic film is shown in black solid lines, while the performance of the electrodes made using binder in NMP solution is shown in gray dashed lines. The cycling data shows that certain embodiments described herein have results that at least match that of using solvent based binder, with potential improvement of battery performance.

As described herein, new binders/adhesives (e.g., insoluble in solvents) can be tested and used to prepare battery electrodes. Certain embodiments described herein can attach electrochemically active material to a current collector using a roll to roll process and in some instances, be solvent free. Various embodiments can reduce manufacturing time and costs by not requiring a solvent in a slurry mix, coating of a slurry mix, and/or drying of a slurry mix.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming an electrode, the method comprising:
    providing a current collector;
    providing a layer comprising an electrochemically active material;
    providing a solid film layer of a first electrode attachment substance on a surface of the current collector between the layer comprising the electrochemically active material and the current collector;
    providing a solid film layer of a second electrode attachment substance on the electrochemically active material opposite the first electrode attachment substance, wherein the layers of the first and second electrode attachment substances are provided in a roll form and rolled onto the current collector and electrochemically active material; and
    applying heat to the layers of first and second electrode attachment substances and the layer of electrochemically active material to adhere the electrochemically active material to the current collector,
    such that the electrochemically active material is adhered indirectly to the current collector via the first electrode attachment substance, with the first electrode attachment substance binding to both the electrochemically active material and the current collector,
    wherein the first electrode attachment substance comprises a polyphenylene sulfide film, a polyether ether ketone film, a polyether sulfone film, or a polysulfone film, and the second electrode attachment substance comprises a different one of the polyphenylene sulfide film, polyether ether ketone film, polyether sulfone film, or polysulfone film.

2. The method of claim 1, wherein the electrochemically active material is sandwiched between the provided layers of the first and second electrode attachment substances.

3. The method of claim 1, wherein the electrochemically active material is provided in powder form.

4. The method of claim 1, wherein the electrochemically active material is provided as a film.

5. The method of claim 4, wherein the film comprises a silicon carbon composite film.

6. The method of claim 1, wherein the electrochemically active material comprises at least about 50% to about 100% by weight of silicon.

7. The method of claim 6, wherein the electrochemically active material comprises the silicon at about 60% to about 100% by weight.

8. The method of claim 7, wherein the electrochemically active material comprises the silicon at about 70% to about 100% by weight.

9. The method of claim 8, wherein the electrochemically active material comprises the silicon at about 80% to about 100% by weight.

10. The method of claim 1, wherein the layer of the first electrode attachment substance comprises a thermoplastic film.

11. The method of claim 1, wherein the layer of the first electrode attachment substance is insoluble in a solvent at a temperature below about 200° C.

12. The method of claim 1, wherein the layer of the first electrode attachment substance comprises polyethylene terephthalate film.

13. The method of claim 1, wherein adhering comprises applying pressure to the electrode attachment substance and/or the electrochemically active material to adhere the electrochemically active material to the current collector.

14. The method of claim 1, wherein adhering comprises an extrusion process.

15. The method of claim 1, wherein the current collector is provided in a roll form.

16. The method of claim 1, wherein the layer comprising electrochemically active material is provided in a roll form.

17. The method of claim 1, wherein the method comprises a roll to roll process.

18. The method of claim 1, wherein the electrochemically active material is a first electrochemically active material, the method further comprising:
    providing a layer comprising a second electrochemically active material on a second side of the current collector opposite the first electrochemically active material;
    providing a solid layer of a third electrode attachment substance on a surface of the layer comprising the second electrochemically active material such that the second electrochemically active material is between the third electrode attachment substance and the current collector;
    adhering the second electrochemically active material to the second side of the current collector via the third electrode attachment substance; and
    applying heat to the third electrode attachment substance and the second electrochemically active material to adhere the second electrochemically active material to the second side of the current collector.

19. The method of claim 18, further comprising providing a solid layer of a fourth electrode attachment substance between the layer comprising the second electrochemically active material and the current collector such that the second electrochemically active material is sandwiched between the third and fourth electrode attachment substances.

20. The method of claim 18, wherein the second electrochemically active material is provided in powder form.

21. The method of claim 18, wherein the second electrochemically active material is provided as a film.

22. The method of claim 18, wherein the second electrochemically active material comprises a silicon carbon composite film.

23. The method of claim 18, wherein the second electrochemically active material comprises at least about 50% to about 100% by weight of silicon.

24. The method of claim 23, wherein the second electrochemically active material comprises the silicon at about 60% to about 100% by weight.

25. The method of claim 24, wherein the second electrochemically active material comprises the silicon at about 70% to about 100% by weight.

26. The method of claim 25, wherein the second electrochemically active material comprises the silicon at about 80% to about 100% by weight.

27. The method of claim 18, wherein the third electrode attachment substance comprises a thermoplastic film.

28. The method of claim 18, wherein the third electrode attachment substance comprises a different material than the first or second electrode attachment substance.

29. The method of claim 18, wherein adhering the first electrochemically active material and adhering the second electrochemically active material occur simultaneously.

30. The method of claim 18, wherein the electrode is a negative electrode.

* * * * *